(12) United States Patent
Rantalainen

(10) Patent No.: US 7,631,668 B2
(45) Date of Patent: Dec. 15, 2009

(54) PIPING ELEMENT AND MANUFACTURING METHOD AND APPARATUS

(75) Inventor: Janne Rantalainen, Villähde (FI)

(73) Assignee: Uponor Innovation AB, Fristad (SE)

( * ) Notice: Subject to any disclaimer, the term of this patent is extended or adjusted under 35 U.S.C. 154(b) by 719 days.

(21) Appl. No.: 10/504,368

(22) PCT Filed: Feb. 11, 2003

(86) PCT No.: PCT/FI03/00105

§ 371 (c)(1),
(2), (4) Date: Jan. 26, 2005

(87) PCT Pub. No.: WO03/068481

PCT Pub. Date: Aug. 21, 2003

(65) Prior Publication Data

US 2005/0121093 A1    Jun. 9, 2005

(30) Foreign Application Priority Data

Feb. 12, 2002    (FI) .................................. 20020280

(51) Int. Cl.
*F16L 9/14* (2006.01)

(52) U.S. Cl. .................. 138/149; 138/148; 138/121; 138/111; 138/114

(58) Field of Classification Search .................. 138/149, 138/121, 122, 148, 114, 111, 115, 116, 137, 138/140, 141, DIG. 1; 428/36.91
See application file for complete search history.

(56) References Cited

U.S. PATENT DOCUMENTS

| | | | | |
|---|---|---|---|---|
| 3,853,149 A | * | 12/1974 | Stine | 138/111 |
| 3,866,670 A | * | 2/1975 | Cramer et al. | 165/47 |
| 4,194,536 A | | 3/1980 | Stine et al. | 138/149 |
| 4,271,218 A | * | 6/1981 | Heckel et al. | 138/141 |
| 4,529,009 A | | 7/1985 | Horner et al. | 138/111 |
| 4,706,711 A | * | 11/1987 | Czvikovszky et al. | 138/103 |
| 4,713,271 A | * | 12/1987 | Searl et al. | 428/36.5 |
| 4,929,409 A | | 5/1990 | Agren et al. | 264/508 |
| 5,400,602 A | * | 3/1995 | Chang et al. | 62/50.7 |

FOREIGN PATENT DOCUMENTS

| | | |
|---|---|---|
| EP | 0 246 890 | 11/1987 |
| EP | 0 459 973 A1 | 12/1991 |
| GB | 2 166 833 A | 5/1986 |
| GB | 2 259 270 A | 3/1993 |
| GB | 2 323 653 A | 9/1998 |
| WO | WO 99/16699 | 4/1999 |

* cited by examiner

*Primary Examiner*—Patrick F Brinson
(74) *Attorney, Agent, or Firm*—Occhiuti Rohlicek & Tsao LLP

(57) ABSTRACT

A piping element having at least two longitudinal components, such as flow pipes (4), outside of which there is an insulator (3), outside of which there is a corrugated outer sheath (2). The piping element is bendable. Fastening means are arranged to the longitudinal components to prevent the longitudinal movement of the longitudinal components in relation to each other.

13 Claims, 2 Drawing Sheets

PIPING ELEMENT AND MANUFACTURING METHOD AND APPARATUS

FIELD OF THE INVENTION

The invention relates to a piping element having at least two longitudinal components, outside of which there is in an insulator, outside of which there is a corrugated outer sheath, whereby the piping element is bendable.

Further, the invention relates to a method for manufacturing a piping element, in which method at least two longitudinal components are fed, an insulator is arranged outside the longitudinal components and a corrugated outer sheath is formed outside the insulator.

The invention also relates to an apparatus for manufacturing a piping element, the apparatus comprising means for feeding at least two longitudinal components, means for arranging an insulator outside the longitudinal components, and an extruder and a corrugator for forming a corrugated outer sheath outside the insulator.

BACKGROUND OF THE INVENTION

U.S. Pat. No. 4,929,409 discloses an apparatus for manufacturing a piping element. Innermost in the piping element, there is a flow pipe and around it an insulator. Outside the insulator, there is a corrugated outer sheath. The solution of the U.S. patent can be applied to the manufacture of piping elements that have two or more flow pipes. The flow pipes are then placed in a longitudinal insulation profile having grooves or slots for the pipes. The produced piping element is very good in ring stiffness and is, therefore, especially well suited for use in underground installations, such as district heating networks. The piping element is also flexible and can be coiled for storage and transport. During installation, the piping element is unwound from the coil. The flow pipes then endeavour to move in the longitudinal direction. Coupling the pipes is, therefore, quite difficult and some extra working reserve need to be left at the end of the piping element for safety's sake.

In district heating use, piping elements are also known, in which polyurethane foam is sprayed outside the flow pipes, and an outer sheath is arranged outside the polyurethane foam. Because of the polyurethane foam, this type of piping element is rigid and unbending and its transport, installation and handling is quite arduous and difficult. In addition, when coupling the piping element, the polyurethane foam outside the flow pipe needs to be stripped away, which is quite arduous and difficult. When the polyurethane foam is stripped, a possible oxygen diffusion protection layer arranged outside the pipe is quite easily detached, which weakens the working characteristics of the piping element considerably.

BRIEF DESCRIPTION OF THE INVENTION

It is an object of the present invention to provide a piping element that is improved with respect to the prior art, and a method and apparatus for manufacturing it.

The piping element of the invention is characterized in that the piping element comprises fastening means for preventing the longitudinal movement of the longitudinal components with respect to each other.

Further, the method of the invention is characterized by arranging fastening means to the longitudinal components to prevent the longitudinal movement of the longitudinal components with respect to each other.

Yet further, the apparatus of the invention is characterized in that the apparatus comprises means for arranging fastening means to the longitudinal components in such a manner that they prevent the longitudinal movement of the longitudinal components with respect to each other.

The essential idea of the invention is that the piping element always has at least two longitudinal components, such as flow pipes, and fastening means for preventing the longitudinal movement of the longitudinal components with respect to each other. Outside the longitudinal components, there is an insulator and outside the insulator, there is a corrugated outer sheath, whereby the piping element is bendable. The idea of another embodiment is that each longitudinal component touches at least one other longitudinal component. The idea of yet another embodiment is that the fastening means are made up of plastic film that is wound in the form of a helical curve around the longitudinal components in such a manner that the plastic film touches each longitudinal component.

The invention provides the advantage that the provided piping element can be wound into a coil for transport and storage, for instance, and when installed from the coil to the usage site, the longitudinal components of the piping element cannot substantially move longitudinally with respect to each other, whereby the handling and installation of the piping element is simple and easy. By arranging each longitudinal component to touch at least one other longitudinal component, the piping element becomes compact in cross-section. The outer diameter of the piping element, for instance, can then be made reasonably small in comparison with a piping element, for instance, in which the longitudinal components are placed in the grooves of a longitudinal profile made of insulating material, in which case there is insulating material between the longitudinal components. As the outer diameter of the piping element decreases, so does heat loss from the piping element, because the heat-evaporating sheath is smaller. Similarly, a decrease in the diameter of the piping element provides material savings. Using plastic film, the longitudinal components can be fixed in place in a simple, inexpensive and convenient manner.

BRIEF DESCRIPTION OF THE FIGURES

The invention is described in greater detail in the attached drawings, in which.

In the figures, the invention is shown in a simplified manner for the sake of clarity.

DETAILED DESCRIPTION OF THE INVENTION

Figure 1:
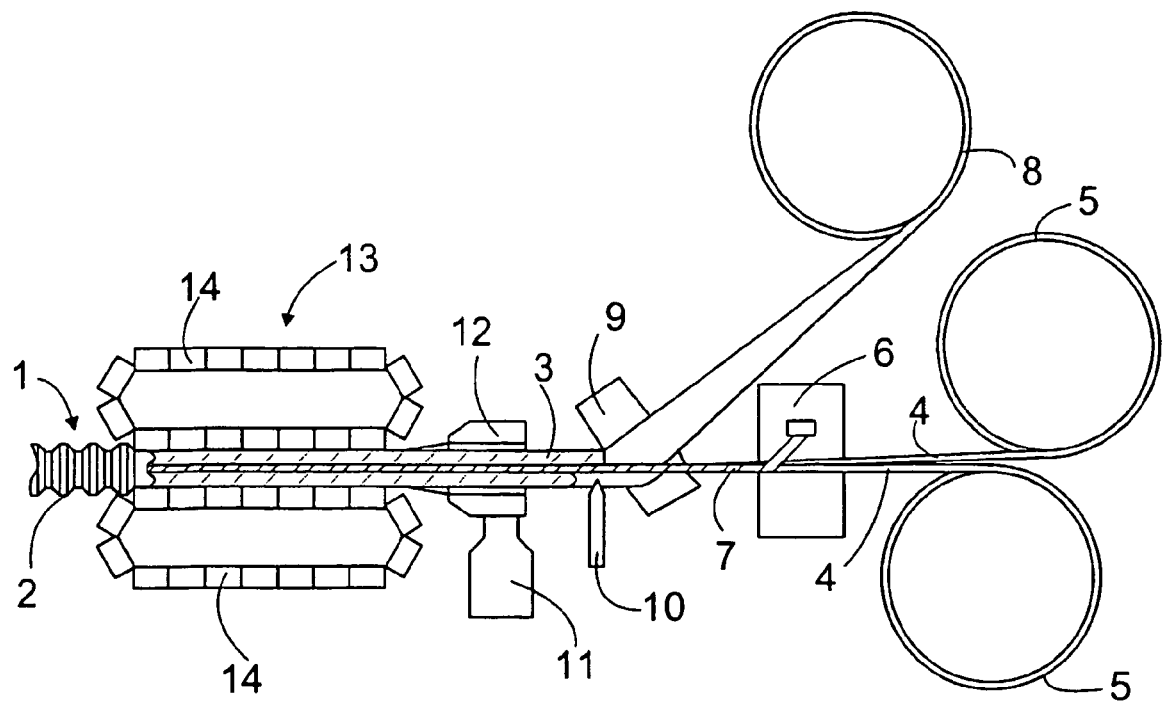
FIG. 1 is a schematic partly cross-sectional side view of an apparatus for manufacturing a piping element.

FIG. 1 shows an apparatus for manufacturing a piping element 1. The piping element 1 has a corrugated outer sheath 2. Inside the outer sheath 2, there is an insulator 3. Inside the insulator 3, there are longitudinal components. In the case of FIG. 1, the longitudinal components are flow pipes 4. In addition to or instead of the flow pipes 4, the longitudinal components can for instance be cables or protective pipes or protective profiles for cables installed inside them.

The flow pipes 4 are manufactured in advance and wound into coils 5. The apparatus thus comprises means for feeding the flow pipes 4 from the coils 5, but the means that support the coils 5 and enable the feeding of the pipes 4 are not shown in the attached figure for the sake of clarity. The flow pipes 4 are fed through a winding device 6, in which plastic film 7 is wound around the pipes 4. Because the flow pipes 4 move continuously forward in the apparatus, i.e. to the left in FIG. 1, and the winding device 6 winds the plastic film roll around the pipes 4, the plastic film 7 settles around the pipes 4 in the form of a helical curve or spiral. The plastic film 7 is wound tightly around the flow pipes 4 and it touches each of the pipes 4. The plastic film 7 wound around the flow pipes 4 substantially prevents the longitudinal movement of the pipes 4 with respect to each other when the piping element is handled, for instance when the piping element 1 is coiled or uncoiled or during the final installation of the piping element 1 when it is bent and straightened.

The insulator 3 is a prefabricated insulator and it is in a sheet-like form on a coil 8. For the sake of clarity, FIG. 1 does not show means for supporting and turning the coil 8. From the coil 8, the sheet-like insulator 3 is fed through a wrapping device 9, in which the sheet-like insulator 3 is wrapped around the flow pipes 4. The sides of the sheet-like insulator 3 are joined with a welding device 10. The seam formed by the two sides of the sheet-like insulator 3 placed against each other is for instance melted closed with hot air in such a manner that the insulator 3 completely surrounds the flow pipes 4. The welding device 10 can also melt the seam closed in some other manner known per se than by utilizing hot air. Instead of the welding device 10, the sides of the sheet-like insulator can also be joined with a gluing device, for instance.

The flow pipes 4 and the insulator 3 wrapped around them are led through the die 12 of an extruder 11. The extruder 11 and die 12 extrude outside the insulator 3 a plastic layer, from which the corrugated outer sheath 2 is formed for the piping element 1 in the corrugator 13. The corrugator 13 has two sets of moving chill moulds 14 in a manner known per se. The structure and operation of the extruder 11, die 12 and corrugator 13 are not described in more detail herein, because they are fully known to a person skilled in the art.

Figure 2:
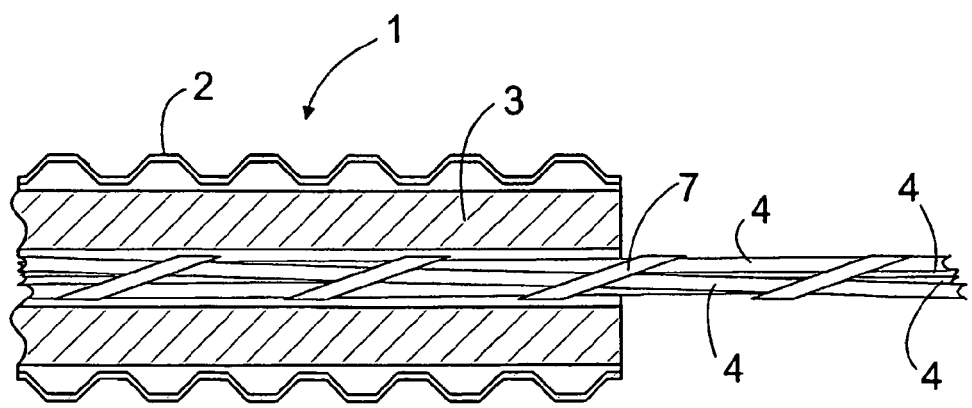
FIG. 2 is a schematic cross-sectional side view of a piping element.

The piping element 1 shown in FIG. 2 has four flow pipes 4. In such a case, two of the pipes are typically made of cross-linked polyethylene PEX equipped with an external oxygen diffusion protection layer and two are made of conventional unprotected cross-linked polyethylene PEX. The oxygen diffusion protected pipes 4 are then used for heat piping and the unprotected pipes 4 typically for water supply systems, such as tap water systems.

The flow pipes 4 are arranged in such a manner that each flow pipe 4 touches at least one other flow pipe 4. The plastic film 7 is wound in the form of a helical curve around the flow pipes 4 so that the plastic film 7 touches each of the flow pipes 4 and thus prevents the flow pipes 4 from moving longitudinally with respect to each other. The material of the plastic film 7 can be low-density polyethylene PE-LD, for instance, and its thickness 20 μm, for instance. The width of the plastic film 7 can then be 60 to 120 mm, for instance. The piping element 1 of FIG. 2 is compact in structure. When the flow pipes 4 are tightly against each other, the total diameter of the piping element 1 also becomes quite small. Heat loss from the piping element 1 is quite low, because the evaporating sheath is then also quite small. Earlier, a piping element with four flow pipes, for instance, has been made by arranging the flow pipes into a longitudinal profile made of an insulating material, and an insulator and outer sheath has been arranged outside the profile. The flow pipes 4 then have insulating material between them. When comparing the piping element of FIG. 2 with the earlier product, it has been noted that in the earlier solution, in which three of the flow pipes have an outer diameter of 32 mm and one of 18 mm, the outer diameter of the piping element 1 has had to be 175 mm. In the solution of FIG. 2, if three of the flow pipes have an outer diameter of 32 mm and one of 18 mm, the outer diameter can be 140 mm. Calculations have proven that this produces an 18% saving in material costs and a 16% saving in total costs.

The flow pipes 4 are wound in the form of a spiral or a helical curve. This winding also in turn helps in that, when the piping element 1 is bent, the flow pipes 4 do not endeavour to move in relation to each other. When manufacturing the piping element 1, the flow pipes 4 can be wound with a separate winding device. Conducted tests show, however, that the flow pipes 4 try to some extent to wind in relation to each other even without any separate winding arrangement. It has been found that this type of self-winding provides a suitable winding in most cases.

The insulator 3 is most preferably made of cross-linked closed-cell polyethylene foam. The insulator 3 can be formed of several prefabricated insulating sheet layers. The thicknesses of the different layers can be the same. Naturally, the width of an outer layer must be greater than that of an inner layer.

The corrugated outer sheath 2 is most preferably made of polyethylene PE. Most preferably, the longitudinal components, such as the flow pipes 4, insulator 3 and outer sheath 2, of the piping element 1 are all made of either cross-linked or conventional polyethylene. For instance, the handling of the piping element 1 during winding is then simple and easy. It is naturally also possible to use other materials. For instance, the insulator 3 can also be made of foamed polypropylene. Correspondingly, the outer sheath 2 can also be made of polypropylene.

The fact that the outer sheath 2 is corrugated makes the ring stiffness of the piping element 1 quite good, for instance 8 to 12 $kN/m^2$. The piping element 1 is especially well suited for underground use. Possible applications are district heating networks and tap water systems, for instance. Due to the corrugation and the softness of the insulator 3, the piping element is bendable. The fact that the piping element 1 is bendable means that the piping element can be coiled for storage and transport and uncoiled for installation. The outer diameter of the piping element 1 can typically be 100 to 300 mm. Piping elements 1 of this kind can be coiled for storage and transport into a coil with a diameter of 0.8 to 3 m, for instance.

The drawing and the related description are intended only to illustrate the idea of the invention. The invention may vary in detail within the scope of the claims. Thus, most preferably, the insulating layer is formed of a prefabricated insulating sheet. The insulator can, however, also be made of a material that is prefabricated into a tube, in which case the tube has a longitudinal slot, through which the longitudinal components, such as flow pipes 4, are installed inside the insulating tube. When the longitudinal component is a protective pipe or profile, inside which a cable is to be installed, the binding of the longitudinal components makes it possible to pass the cable into the protective pipe or profile in such a manner that the protective profile or pipe does not essentially move longitudinally. The cable can for instance be a heating cable for heating the flow pipe 4 and the fluid in it, or some other cable can be passed into the protective profile or pipe that is in no way related to the main purpose of use of the piping element.

Figure 3:
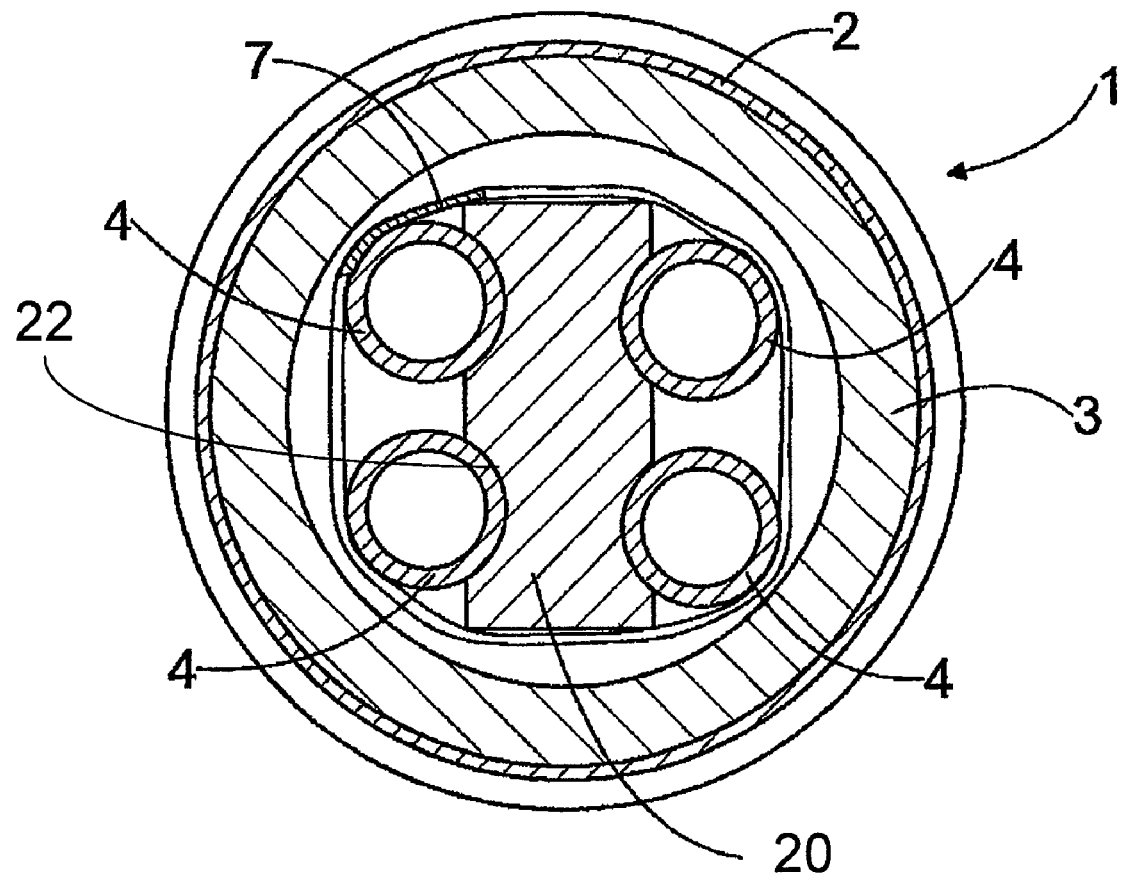
FIG. 3 is a schematic cross-sectional end view of another embodiment of a piping element.

Further, the longitudinal component can also be a longitudinal intermediate insulation profile 20 (FIG. 3) that is placed between the flow pipes 4. The cross section of the longitudinal intermediate insulation profile 20 can have many shapes. At its simplest, the longitudinal intermediate insulation profile

20 can be a longitudinal intermediate insulation sheet. The longitudinal intermediate insulation sheet can be rectangular in cross-section or it can have one or more grooves and/or protrusions 22. The piping element 1 can for instance have four flow pipes, in which case the longitudinal intermediate insulation sheet is arranged between the flow pipes in such a manner that it has two flow pipes 4 on each side. In such a solution, the piping element 1 can have the pipes of a hot water system on one side and the pipes of a tap water system on the other side of the intermediate insulation sheet. The longitudinal intermediate insulation sheet then prevents heat transmission between the flow pipes 4 of the different systems. A longitudinal intermediate insulation profile can be made of closed-cell polyethylene foam, for instance. In this embodiment, too, fastening means preferably prevent the longitudinal movement of all longitudinal components with respect to each other.

The invention claimed is:

1. A piping element having at least two longitudinal components, outside of which there is an insulator, outside of which there is a corrugated outer sheath, where by the piping element is bendable, wherein the piping element comprises fastening means for preventing the longitudinal movement of the longitudinal components with respect to each other,
   wherein the fastening means is arranged to touch each of the longitudinal components.

2. A piping element having at least two longitudinal components, outside of which there is an insulator, outside of which there is a corrugated outer sheath, whereby the piping element is bendable,
   wherein the piping element comprises fastening means for preventing the longitudinal movement of the longitudinal components with respect to each other,
   wherein the fastening means are made up of plastic film that is wound outside the longitudinal components in the form of helical curve and arranged to touch each of the longitudinal components.

3. A piping element as claimed in claim 1, wherein each of the longitudinal components touches at least one other longitudinal component.

4. A piping element as claimed in claim 1, wherein at least two of the longitudinal components are flow pipes.

5. A piping element as claimed in claim 4, wherein at least one of the longitudinal components is a longitudinal intermediate insulation profile, which is arranged between the flow pipes with at least one flow pipe on each side.

6. A piping element having at least two longitudinal components, outside of which there is an insulator, outside of which there is a corrugated outer sheath, whereby the piping element is bendable,
   wherein the piping element comprises fastening means for preventing the longitudinal movement of the longitudinal components with respect to each other,
   wherein at least two of the longitudinal components are flow pipes,
   wherein four of the longitudinal components are flow pipes and one a longitudinal intermediate insulation sheet, and the longitudinal intermediate insulation sheet is arranged between the flow pipes with two flow pipes on each side.

7. A piping element as claimed in claim 1, wherein the insulator is made of a material prefabricated before the piping element is made.

8. A piping element as claimed in claim 7, wherein the insulator is made of an insulation sheet wrapped around the longitudinal components.

9. A piping element as claimed in claim 1, wherein the insulator is made of an elastic material.

10. A piping element as claimed in claim 9, wherein the insulator is made of cross-linked closed-cell polyethylene foam.

11. A piping element as claimed in claim 1, wherein the piping element is arranged to be installed underground.

12. A piping element as claimed in claim 2, wherein each of the longitudinal components touches at least one other longitudinal component.

13. A piping element as claimed in claim 2, wherein at least two of the longitudinal components are flow pipes.

* * * * *